(12) United States Patent
Suzuki

(10) Patent No.: US 8,459,618 B2
(45) Date of Patent: Jun. 11, 2013

(54) HUMIDITY CONDITIONING AIR SYSTEM FOR PNEUMATICALLY DRIVEN DEVICE

(75) Inventor: Toshihiro Suzuki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 397 days.

(21) Appl. No.: 12/681,185

(22) PCT Filed: Oct. 22, 2007

(86) PCT No.: PCT/JP2007/070529
§ 371 (c)(1),
(2), (4) Date: Aug. 24, 2010

(87) PCT Pub. No.: WO2009/054036
PCT Pub. Date: Apr. 30, 2009

(65) Prior Publication Data
US 2010/0308480 A1    Dec. 9, 2010

(51) Int. Cl.
*B01F 3/04*    (2006.01)
(52) U.S. Cl.
USPC .................................. 261/104; 261/DIG. 34
(58) Field of Classification Search
USPC .............................. 261/74, 102, 104, DIG. 34
See application file for complete search history.

(56) References Cited

U.S. PATENT DOCUMENTS

| | | | | |
|---|---|---|---|---|
| 2,857,983 A | * | 10/1958 | Shada | 184/55.2 |
| 3,735,559 A | * | 5/1973 | Salemme | 95/52 |
| 7,753,991 B2 | * | 7/2010 | Kertzman | 95/52 |
| 8,226,378 B2 | * | 7/2012 | Daniels et al. | 417/228 |
| 2010/0077784 A1 | | 4/2010 | Suzuki | |

FOREIGN PATENT DOCUMENTS

| | | |
|---|---|---|
| DE | 11 2007 003 285 T5 | 1/2010 |
| JP | 01304028 | 12/1989 |
| JP | 09303265 | 11/1997 |
| JP | 3057115 | 3/1999 |
| JP | 2003-245516 | 9/2003 |
| JP | 2003 245516 | 9/2003 |
| JP | 2003-265933 | 9/2003 |
| JP | 2006 297221 | 11/2006 |
| JP | 2006 346635 | 12/2006 |
| JP | 2007 29794 | 2/2007 |
| JP | 2007-29794 | 2/2007 |

OTHER PUBLICATIONS

German Office Action issued Oct. 11, 2011, in Patent Application No. 11 2007 003 679.6.
Korean Office Action issued Mar. 23, 3012, in Korean Patent Application No. 2010-7006817 (with English Translation).

* cited by examiner

*Primary Examiner* — Charles Bushey
(74) *Attorney, Agent, or Firm* — Oblon, Spivak, McClelland, Maier & Neustadt, L.L.P.

(57) ABSTRACT

An air system in which the supply air from a compressed air source is supplied to a pneumatically driven device through a pneumatic line, including humidity conditioning tubes used for the whole or a part of the pneumatic line. This humidity conditioning tube includes a polymer material having moisture selective permeability in both inward and outward directions according to steam partial pressure in and outside thereof, and the supply air supplied to the pneumatically driven device through the tube is dehumidified or humidified by this humidity conditioning tube. An air system can suppress generation of mist or the like in supply air without shortening a life of a device caused by supply of low dewpoint air to the pneumatically driven device.

8 Claims, 2 Drawing Sheets

HUMIDITY CONDITIONING AIR SYSTEM FOR PNEUMATICALLY DRIVEN DEVICE

TECHNICAL FIELD

The present invention relates to a humidity conditioning air system for pneumatically driven device that conditions humidity in supply air from a compressed air source through a pneumatic line and then supplies the air to the pneumatically driven device.

BACKGROUND ART

In air systems in which a pneumatically driven device such as an air cylinder is driven by supply air from a compressed air source, when the supply air from the compressed air source is supplied toward the pneumatically driven device through a switching valve or when being discharged from the pneumatically driven device, the air is adiabatically expanded inside piping or the pneumatically driven device, and the temperature is lowered and moisture in the air is condensed to form a mist in many cases. This mist gradually grows and is condensed while supply and discharge of the air is repeated, which causes rusts in the pneumatically driven device or deteriorates a lubricant and disturbs smooth operation of the pneumatically driven device.

In order to prevent the condensation, such an art has been widely known that a dehumidifier device made of a large number of fiber polymer permeation membranes having selective moisture permeability called as hollow fiber membrane in general is used to dehumidify the supply air supplied to the pneumatically driven device and to supply dry air to the pneumatically driven device. The dehumidifier device usually accommodates a hollow fiber membrane module formed by arranging a large number of hollow fiber membranes side by side inside a housing so as to flow purge air for discharging moisture separated around the hollow fiber membrane.

Installation of such dehumidifier devices is an effective measure to prevent condensation even when the temperature is lowered by the adiabatic expansion. But since the dehumidifier device should be installed in a pneumatic line between the compressed air source and the pneumatically driven device, not only that a cost is required for installation of the dehumidifier device but an installation space for the dehumidifier device should be also considered, which further raises the cost.

On the other hand, a semiconductor plant or the like has a pneumatic line through which a low dew-point air (super dry air) is supplied all the time, there are an increasing number of cases that the air is also flown through a pneumatic line to which a pneumatically driven device is connected for the above condensation prevention measure.

However, including installation of the dehumidifier devices, if the fully dehumidified low dew-point air is supplied to the pneumatically driven device, grease used at a portion in the pneumatically driven device where parts are in sliding contact with each other or rotating tends to be easily evaporated and shortens the life of the pneumatically driven device, which is a problem.

DISCLOSURE OF INVENTION

Problems to be Solved by the Invention

The present invention has a technical object to provide a humidity conditioning air system for pneumatically driven device which can suppress generation of mist or condensed water in supply air while restricting shortening of life of the pneumatically driven device due to supply of dehumidified low dew-point air to the pneumatically driven device.

More specifically, a technical object of the present invention is to provide a humidity conditioning air system for pneumatically driven device configured to humidify supply air if the air to the pneumatically driven device is fully dehumidified or to have the moisture transpired to the outside if a partial pressure of steam generating mist or condensed water in the supply air becomes high.

Also, another technical object of the present invention is to provide a humidity conditioning air system for pneumatically driven device which enables desired humidity conditioning only by means made of a special material for a humidity conditioning tube constituting the whole or a part of a pneumatic line without disposing the above-mentioned dehumidifier device in the pneumatic line.

Means for Solving the Problems

In order to achieve the above objects, the present invention is a humidity conditioning air system for supplying supply air from a compressed air source to a pneumatically driven device through a pneumatic line in which a humidity conditioning tube is used for the whole or a part of the pneumatic line between the compressed air source and the pneumatically driven device, the humidity conditioning tube is made of a polymer material having moisture selective permeability in both inward and outward directions according to steam partial pressure in and outside the tube, the humidity conditioning tube has a diameter which can be used at least as piping for a general-purpose pneumatic system, and the supply air supplied to the pneumatically driven device through the humidity conditioning tube is dehumidified or humidified by moisture selective permeability in both inward and outward directions in the humidity conditioning tube.

The humidity conditioning tube can be assembled to an air feed/discharge system of the driven device, which is an end on the pneumatically driven device side of the pneumatic line between the compressed air source and the pneumatically driven device or specifically, at an air feed/discharge port or a pipe joint or the like connected thereto.

In the humidity conditioning air system for pneumatically driven device according to the present invention, the humidity conditioning tube may be arranged in plural in the pneumatic line according to a volume of the pneumatically driven device.

Also, in a preferred embodiment of the humidity conditioning air system for pneumatically driven device according to the present invention, if the supply air from the compressed air source is a low dew-point air, the system is configured to humidify the supply air by placing the humidity conditioning tube made of a polymer material with moisture selective permeability in the atmosphere or humidified atmosphere and moreover, if the supply air from the compressed air source is high dew-point air or medium dew-point air, the humidity tube made of a polymer material with moisture selective permeability is connected to a portion of the pneumatic line on the pneumatically driven device side and placed in the atmosphere or dehumidified atmosphere to be used for dehumidification of the supply air.

In the humidity conditioning air system for pneumatically driven device according to the present invention, the humidity conditioning tube might be used in a mode only for the humidifying or dehumidifying of the supply air as mentioned above, but the tube basically functions by transferring the moisture from a portion with higher partial pressure to a portion with lower partial pressure according to steam partial pressure in and outside the humidity conditioning tube so that containment of excessive moisture in the supply air introduced into the pneumatically driven device or supply of excessively dry air to the pneumatically driven device is automatically suppressed.

Advantages of the Invention

According to the humidity conditioning air system for pneumatically driven device of the present invention mentioned above, while shortening of a life of the pneumatically driven device caused by supply of dehumidified low dewpoint air to the pneumatically driven device is restricted, generation of mist or condensed water in the supply air can be suppressed and more specifically, if the supply air to the pneumatically driven device is fully dehumidified, it can be humidified, while if the steam partial pressure generating mist or condensed water in the supply air is raised, the moisture can be transpired to the outside.

Moreover, according to the present invention, desired humidity conditioning can be executed only by means obtained by making the humidity conditioning tube constituting the whole or a part of the pneumatic line by a special material without disposing the above-mentioned conventional dehumidifier device in the pneumatic line.

Figure 1:
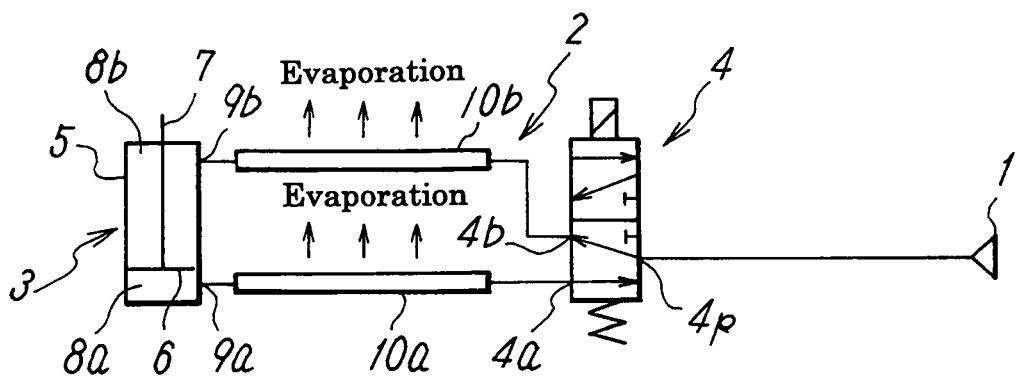
FIG. 1 is a schematic block diagram of a humidity conditioning air system for pneumatically driven device according to the present invention and shows a dehumidification mode of supply air in a pneumatic line.

REFERENCE NUMERALS 1 compressed air source
2 pneumatic line
3 pneumatically driven device
10, 10a, 10b humidity conditioning tube

BEST MODE FOR CARRYING OUT THE INVENTION

Figure 2:
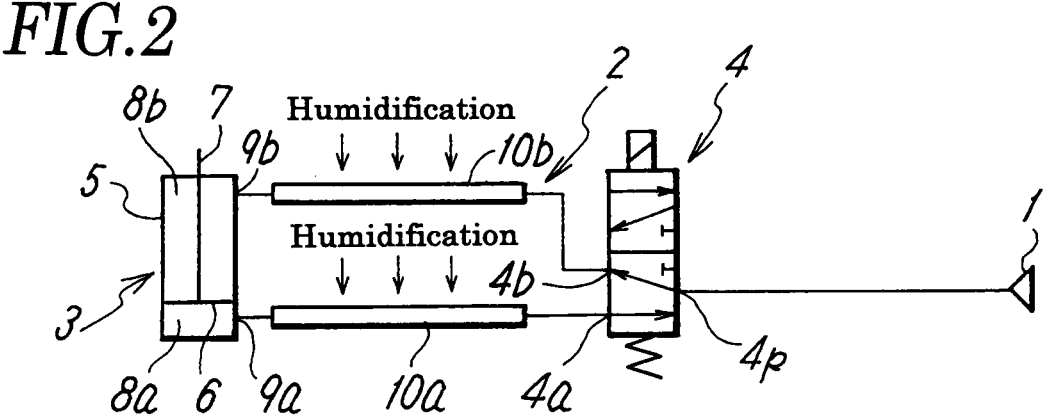
FIG. 2 is a schematic block diagram as above and shows a humidification mode of the supply air in the pneumatic line.

FIGS. 1 and 2 show an outline of an embodiment of a humidity conditioning air system for pneumatically driven device according to the present invention.

The humidity conditioning air system for pneumatically driven device basically is configured such that supply air from a compressed air source 1 is supplied to a pneumatically driven device 3 through a pneumatic line 2 so as to drive the pneumatically driven device 3 by this supply air, and an electromagnetically driven 5-port switching valve 4 for controlling drive of the pneumatically driven device 3 in regular use is interposed in the pneumatic line 2.

In the figures, an air cylinder is shown as the typical pneumatic driven device 3, and this air cylinder has a piston 6 sliding inside a cylinder tube 5 and a rod 7 extending from the piston 6, and on both sides of the piston 6, a head-side pressure chamber 8a having a port 9a and a rod-side pressure chamber 8b having a port 9b are formed, respectively. By switching of the switching valve 4, the supply air from the compressed air source 1 is introduced into the one pressure chamber, while the supply air having been introduced into the other pressure chamber is discharged, and this operation is repeated alternately to the both pressure chambers so that the piston 6 goes back and forth.

The air cylinder shown here is merely an example of the pneumatically driven device, and application of the humidity conditioning air system of the present invention is not limited to the air cylinder. Also, it is only necessary that the 5-port switching valve 4 controls drive of the pneumatically driven device 3 and it is not limited to the illustrated example.

At a part of the pneumatic line 2 between the compressed air source 1 and the pneumatically driven device 3, humidity conditioning tubes 10a, 10b made of a polymer material with moisture selective permeability are connected. The humidity conditioning tube is made of a polymer material such as fluorine resin polymer used as a material for a hollow fiber membrane or the like and having moisture selective permeability through which air does not permeate but moisture in the air permeates both in inward and outward directions according to steam partial pressure in and outside the tube.

The humidity conditioning tubes 10a, 10b are connected to a part between the one output port 4a of the switching valve 4 and the one port 9a of the air cylinder constituting the pneumatically driven device 3 as well as a part between the other output port 4b of the switching valve 4 and the other port 9b of the air cylinder, respectively, that is, a part of a flow passage connected to each port in the pneumatically driven device 3 in the pneumatic line 2, respectively.

The humidity conditioning tube can be connected to the whole of the pneumatic line 2 or more specifically, between the one output port 4a of the switching valve 4 and the one port 9a of the air cylinder as well as between the other output port 4b of the switching valve 4 and the other port 9b of the air cylinder and moreover between the compressed air source 1 and an input port 4p of the switching valve 4 but may be used in a part of the pneumatic line 2 in the above connection mode or another connection mode.

The humidity conditioning tubes 10a, 10b in the humidity conditioning air system are basically used instead of a piping tube connecting the general pneumatically driven device to the compressed air source and thus, it needs to have a feeding function of compressed air similar to the piping tube. More specifically, the humidity conditioning tube has a diameter for piping such that the supply air which can flow through at least one of them can drive a small-sized general-use pneumatically driven device, and it is desirable that instead of a large number of small-diameter pieces used at the expense of a flow rate in order to improve the moisture selective permeability as a whole, an inner diameter and length are provided with which a pressure loss of the supply air flowing between the both ends can be ignored.

For example, in the JIS standards, the minimum diameter of polyurethane for piping in a pneumatic system is specified as [outer diameter×inner diameter]=2×1.2 mm for the one with nominal diameter 2 and the maximum diameter as [outer diameter×inner diameter]=12×8 mm for the one with nominal diameter 12, and this specification is desirably referred to when determining the diameter of the humidity conditioning tube.

In manufacture of the humidity conditioning tube, it is not necessarily advisable to produce a large number of pieces with nominal diameter and in that case, a plurality of humidity conditioning tubes can be arranged side by side in the pneumatic line 2 according to the volume of the connected pneumatically driven device 3, by which manufacture of a large number of humidity conditioning tubes with nominal diameter can be avoided.

In the humidity conditioning air system for pneumatically driven device having the above configuration, if the partial pressure of steam is high to such an extent that mist or condensed water is generated in the supply air supplied to the pneumatically driven device 3 or in the air discharged from the pneumatically driven device 3, or more specifically, if the supply air is non-dehumidified high dew-point air or a medium dew-point air not having reached the low dew-point yet though it is dehumidified, the air is emitted to the outside by permeation of the moisture and naturally evaporated by which the air is dehumidified in the humidity conditioning tube 10a or 10b in the pneumatic line 2 as shown in FIG. 1. The medium dew-point air refers to the air with a possibility of generation of mist or condensed air if the temperature is lowered due to adiabatic expansion at discharge or the like even though after some dehumidification. If the supply air to the pneumatically driven device 3 is low dew-point air which has been fully dehumidified by freezing-type air drier or the like, the steam partial pressure outside the humidity conditioning tube is high, and as shown in FIG. 2, the supply air is humidified.

The dehumidification and humidification can be carried out only by means obtained by making the humidity conditioning tube constituting the whole or a part of the pneumatic line 2 of a special material, and dehumidification or humidification is automatically executed by a difference in steam partial pressures without particular operation from outside. Also, there is no need to dispose a dehumidifier device in the pneumatic line as in the related art.

In the humidity conditioning air system for pneumatically driven device, while shortening of a life of the pneumatically driven device 3 caused by supply of dehumidified low dew-point air to the pneumatically driven device 3 is suppressed, generation of mist or condensed water in the supply air can be restricted as mentioned above.

In the humidity conditioning air system for pneumatically driven device, if the supply air from the compressed air source 1 is dehumidified low dew-point air, by placing the humidity conditioning tubes 10a, 10b in the atmosphere as shown in FIG. 2, the steam partial pressure of the outside atmosphere of the humidity conditioning tubes 10a, 10b becomes higher than the steam partial pressure in the supply air, and to whichever port of the ports 9a, 9b of the air cylinder the supply air is introduced, the supply air is humidified in the humidity conditioning tubes 10a, 10b. If the steam partial pressure in the supply air is raised to an extent that mist is generated in the humidity conditioning tubes 10a, 10b with adiabatic expansion caused by the humidification or the moisture contained in the supply air from the compressed air source 1, the steam partial pressure in the humidity conditioning tube naturally becomes higher than the steam partial pressure in the atmosphere outside the tube, and the moisture permeates the humidity conditioning tube to the outside and is transpired.

The steam partial pressure in the atmosphere is unstable and the difference between that and the steam partial pressure in the supply air in the humidity conditioning tubes 10a, 10b might be decreased, which results in a need to increase a humidification volume. If a relatively large volume of humidification is necessary when low dew-point air (super dry air) or the like supplied all the time in a semiconductor plant is used for driving of the pneumatically driven device 3, measures can be taken such that the lengths of the humidity conditioning tubes 10a, 10b in the pneumatic line 2 are set longer or the tubes are placed in a humidified atmosphere.

On the other hand, if the supply air from the compressed air source 1 is non-dehumidified high dew-point air and dehumidification of the air is a principal purpose, it is only necessary to connect the humidity conditioning tubes 10a, 10b to a part on the pneumatically driven device 3 side in the pneumatic line 2 in many cases as shown in FIG. 1, in which the length may be several cm depending on the case, and the supply air in the pneumatic line 2 can be dehumidified by placing the tubes in the atmosphere. When the supply air is to be dehumidified, the steam partial pressure of the air in the humidity conditioning tubes 10a, 10b often becomes relatively higher than that of the atmosphere, and thus, the purpose of dehumidification can be achieved only by providing the humidity conditioning tube at a part of the pneumatic line 2 in many cases. Alternatively, in order to further improve dehumidification effect, the whole or a majority of the pneumatic line 2 may be constituted by the humidity conditioning tube, or the humidity conditioning tubes may be placed in the dehumidified atmosphere.

The humidity conditioning tubes 10a, 10b might be used in a mode in which only the above-mentioned humidification or dehumidification is carried out for the supply air but the tubes basically function so as to transfer the moisture from a portion with high steam partial pressure to a portion with low steam partial pressure according to the steam partial pressures in and outside the humidity conditioning tube so that containment of excessive moisture in the supply air introduced to the pneumatically driven device or supply of excessively dry air to the pneumatically driven device is automatically suppressed. Thus, the diameter, length or connection position of the humidity conditioning tubes 10a, 10b in the pneumatic line 2 should be set considering those functions.

The humidity conditioning tubes 10a, 10b may be assembled to an air feed/discharge system in the driven device 3, which is an end portion on the pneumatically driven device 3 side in the pneumatic line 2 between the compressed air source 1 and the pneumatically driven device 3, or specifically in and outside of the ports 9a, 9b for air feed/discharge or a pipe joint connected to them or the like.

Figure 3:
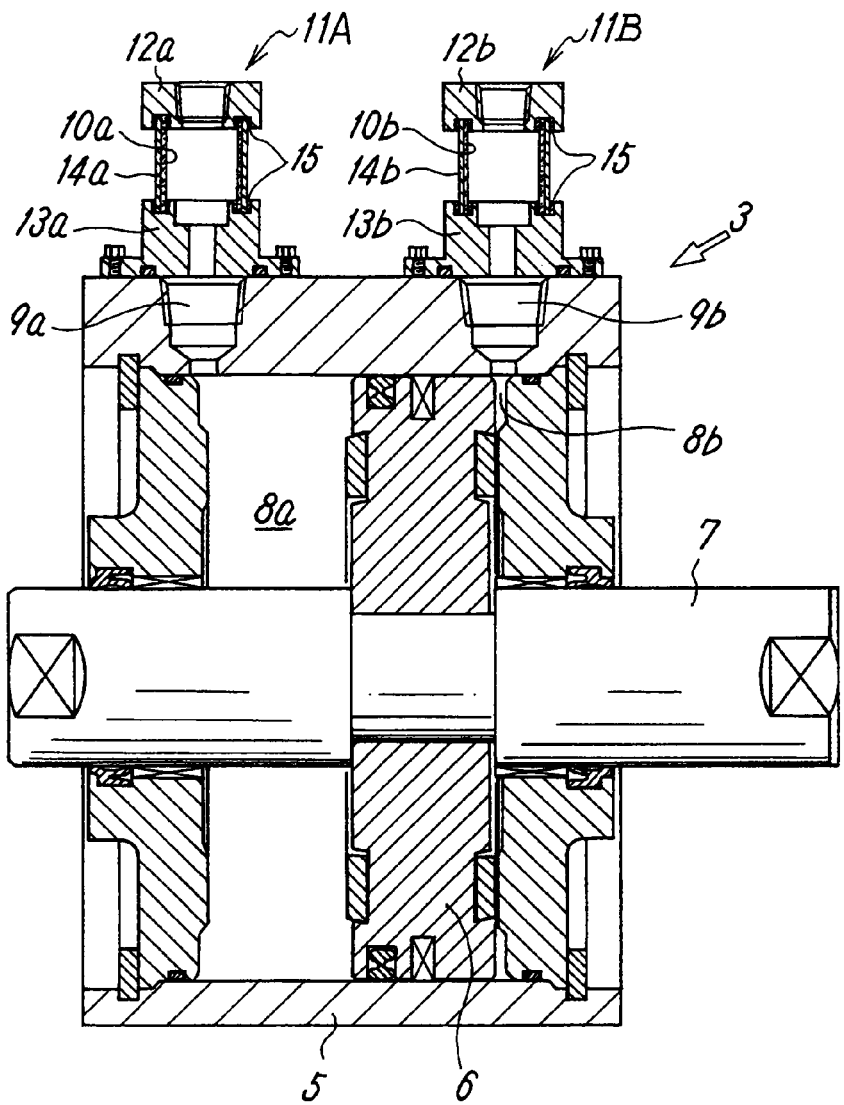
FIG. 3 is a sectional view illustrating a mode in which the humidity conditioning air system for pneumatically driven device according to the present invention is configured by assembling a humidity conditioning tube to the pneumatically driven device.

FIG. 3 shows an embodiment of the humidity conditioning air system for pneumatically driven device according to the present invention configured by assembling humidity conditioning units 11A, 11B having the humidity conditioning tubes 10a, 10b to the ports 9a, 9b in the pneumatically driven device 3, and the air cylinder as the pneumatically driven device 3 in this embodiment has the piston 6 sliding inside the cylinder tube 5 and the rod 7 extended from the piston 6, and the pressure chamber 8a having the port 9a and the pressure chamber 8b having the port 9b are formed on both sides of the piston 6, respectively. The pneumatically driven device 3 is not limited to the air cylinder.

The humidity conditioning units 11A, 11B in which the humidity conditioning tubes 10a, 10b constructed by a polymer material having moisture selective permeability are built are connected to the ports 9a, 9b, which are ends of the pneumatic line 2 between the compressed air source 1 and the pneumatically driven device 3. The humidity conditioning units 11A, 11B connect connecting members 12a, 13a and 12b, 13b at the both ends to each other by the humidity conditioning tubes 10a, 10b, respectively, and the periphery of the tubes 10a, 10b are covered by protective covers 14a, 14b with air permeability. Both ends of the humidity conditioning tubes 10a, 10b and the protective covers 14a, 14b are fixed in each recess groove of the connecting members 12a, 13a and 12b, 13b by a potting agent 15.

The connecting members 13a, 13b on the pneumatically driven device 3 side in the humidity conditioning units 11A, 11B are fixed to the outside of each of the ports 9a, 9b of the pneumatically driven device 3, but they may be built in the pneumatically driven device 3 as long as the humidity conditioning tubes 10a, 10b are held in contact with the outside air or managed atmosphere.

Figure 4:
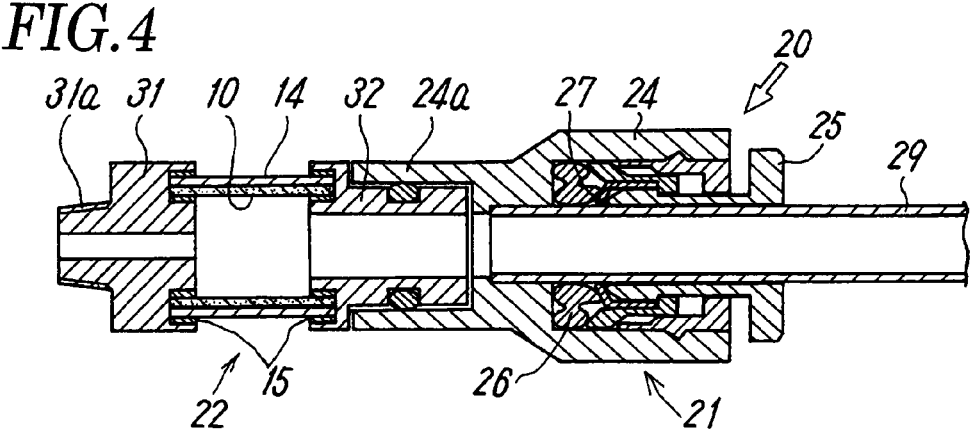
FIG. 4 is a sectional view illustrating a mode in which the humidity conditioning tube is assembled to a pipe joint mounted for air feed/discharge at the pneumatically driven device.

FIG. 4 shows an embodiment in which the humidity conditioning tube is assembled to a pipe joint 20 mounted on the port of the pneumatically driven device 3 for air feed/discharge. The pipe joint 20 is configured by connecting a simplified joint portion 21 and a pressure control unit 22, and the humidity conditioning unit 22 is connected to a port for air feed/discharge in various types of the pneumatically driven devices 3.

The simplified joint portion 21 is a known one that when a piping tube 29 constituting the pneumatic line 2 is deeply inserted into a release bush 25 internally inserted in a main body 24 as shown in the figure, the periphery of the tube 29 is sealed by a seal member 26 and at the same time, a locking claw 27 is locked by an outer peripheral face of the tube 29 so that its removal is prevented, and when the release bush 25 is inserted into the main body 24, lock of the locking claw 27 by the outer peripheral face of the tube 29 is released, and the tube 29 can be easily removed from the simplified joint portion 21.

On the other hand, the humidity conditioning unit 22 is configured such that the both ends of the humidity conditioning tube 10 made of a polymer material having the moisture selective permeability and the protective cover 14 with permeability covering the periphery thereof are connected to connecting members 31, 32, and the both ends of the humidity conditioning tube 10 and the protective cover 14 are fixed to each recess groove in the connecting members 31, 32 by the potting agent 15. At the connecting member 31 in the humidity conditioning unit 22, a connecting screw 31a to be connected to the port of the pneumatically driven device 3 is provided, and the other connecting member 32 is configured capable of appropriate joint by being inserted into a connecting cylinder portion 24a in the main body 24 of the simplified joint portion 21 in an airtight manner.

As mentioned above, the humidity conditioning tube can be assembled in or outside of the port for air feed/discharge in the pneumatically driven device, and at least when the humidity conditioning tube is assembled on the inner side of the port for air feed/discharge in the pneumatically driven device, the pneumatic line in this specification should be understood to also include the air feed/discharge system to a driving pressure chamber in the pneumatically driven device.

The invention claimed is:

1. A humidity conditioning air system for a pneumatically driven device in which supply air from a compressed air source is supplied to the pneumatically driven device through a pneumatic line, wherein:

a humidity conditioning tube is connected to the whole or a part of the pneumatic line between the compressed air source and the pneumatically driven device, the humidity conditioning tube being constructed by a polymer material having moisture selective permeability in both inward and outward directions according to steam partial pressures in and outside thereof;

the humidity conditioning tube has a diameter that can be used as piping for a general-use pneumatic system and is placed in the atmosphere; and the supply air supplied to the pneumatically driven device through the humidity conditioning tube is dehumidified or humidified between the supply air and the atmosphere via the humidity conditioning tube by the moisture selective permeability in both the inward and outward directions in the humidity conditioning tube.

2. The humidity conditioning air system for pneumatically driven device according to claim 1, wherein a plurality of the humidity conditioning tubes are arranged side by side in the pneumatic line according to a volume of the pneumatically driven device.

3. The humidity conditioning air system for pneumatically driven device according to claim 1, wherein the supply air from the compressed air source is low dew-point air and the humidity conditioning tube is placed in the humidified atmosphere.

4. The humidity conditioning air system for pneumatically driven device according to claim 2, wherein the supply air from the compressed air source is low dew-point air and the humidity conditioning tube is humidified atmosphere.

5. The humidity conditioning air system for pneumatically driven device according to claim 1, wherein the supply air from the compressed air source is high dew-point air or medium dew-point air and the humidity conditioning tube is connected to a part on the pneumatically driven device side in the pneumatic line and is placed in the dehumidified atmosphere.

6. The humidity conditioning air system for pneumatically driven device according to claim 2, wherein the supply air from the compressed air source is high dew-point air or medium dew-point air and the humidity conditioning tube is connected to a part on the pneumatically driven device side in the pneumatic line and is placed in the dehumidified atmosphere.

7. The humidity conditioning air system for pneumatically driven device according to claim 1, wherein the humidity conditioning tube is assembled to an air feed/discharge system in the pneumatically driven device.

8. The humidity conditioning air system for pneumatically driven device according to claim 1, wherein one humidity conditioning tube is connected to the whole or a part of a flow channel connecting a port of the compressed air and a port of the pneumatically driven device.

* * * * *